United States Patent [19]

Buhl et al.

[11] Patent Number: 5,029,488
[45] Date of Patent: Jul. 9, 1991

[54] BEARING FOR THE GEAR SHIFT LEVER OF THE GEAR CHANGE BOX IN MOTOR VEHICLES

[75] Inventors: Reinhard Buhl, Bohmte; Ulrich Stöckert, Diepholz; Andreas Schmidt, Bohmte, all of Fed. Rep. of Germany

[73] Assignee: Lemförder Metallwaren AG, Fed. Rep. of Germany

[21] Appl. No.: 320,411

[22] Filed: Mar. 8, 1989

[30] Foreign Application Priority Data

Mar. 12, 1988 [DE] Fed. Rep. of Germany ....... 3808272

[51] Int. Cl.$^5$ .................... F16C 11/06; B60K 20/00
[52] U.S. Cl. .................... 74/473 P; 74/473 R; 74/504; 403/114; 403/131
[58] Field of Search ............. 74/504, 473 P, 473 R, 74/471 XY, 553, 543–548; 403/131, 114, 125, 128

[56] References Cited

U.S. PATENT DOCUMENTS

| 4,543,842 | 10/1985 | Katayama | 74/473 P |
|---|---|---|---|
| 4,569,245 | 2/1986 | Feldt et al. | 74/473 P |
| 4,581,951 | 4/1986 | Watson | 74/473 P |
| 4,662,772 | 5/1987 | Schultz | 403/114 |
| 4,693,135 | 9/1987 | La Rocca et al. | 74/473 P X |
| 4,787,257 | 11/1988 | Ott et al. | 74/473 P |
| 4,827,793 | 5/1989 | Loeffler et al. | 74/473 R |
| 4,916,966 | 4/1990 | Weishaupt et al. | 403/114 X |

FOREIGN PATENT DOCUMENTS

| 254717 | 6/1967 | Austria | 74/504 |
|---|---|---|---|
| 0104024A1 | 3/1984 | European Pat. Off. | 74/504 |
| 2460769 | 7/1976 | Fed. Rep. of Germany | 74/473 P |
| 3016373A1 | 10/1981 | Fed. Rep. of Germany | 74/504 |
| 3208543C1 | 10/1983 | Fed. Rep. of Germany | 74/504 |
| 905005 | 9/1962 | United Kingdom | 74/473 P |
| 2093166 | 8/1982 | United Kingdom | 74/504 |

Primary Examiner—Vinh T. Luong
Attorney, Agent, or Firm—McGlew & Tuttle

[57] ABSTRACT

A bearing for a gear shift lever for the mechanical remote control of the selector shaft of a gear change unit in motor vehicles includes a stationary housing pivot which supports a gear shift lever in such a manner that it can swivel around a selection axis and also around a change axis lying at an angle in relation to it. The gear shift lever is in addition jointed by a sliding selector shaft with the gear shift shaft in a gear change box or transmission. The gear change lever is supported in a movable bearing that can swivel around a defined axis. The movable bearing in turn can swivel around another redefined axis. Also, the lever is pivotal with a limited degree of freedom, around a main axis positioned through the center of the selection axis and also is pivotal at a link connection with the sliding selector shaft. The pivotal bearing housed in the stationary housing part is attached to the body.

3 Claims, 2 Drawing Sheets

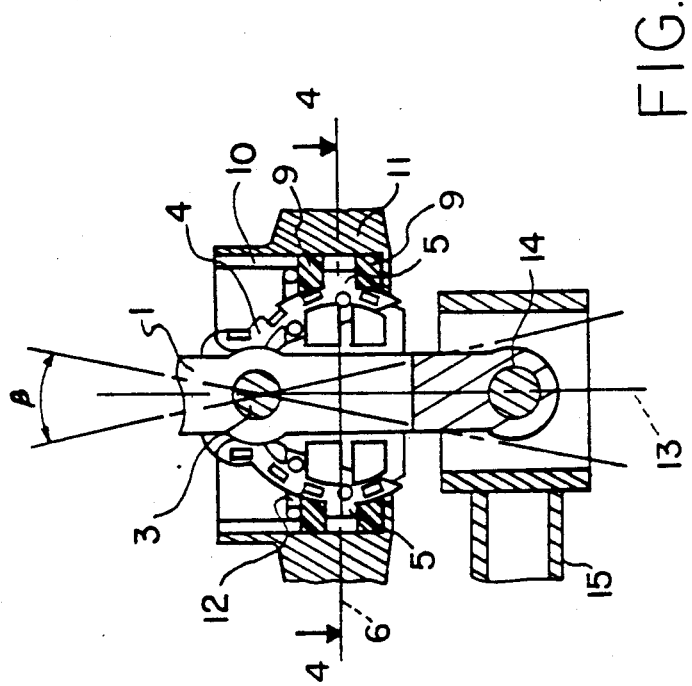
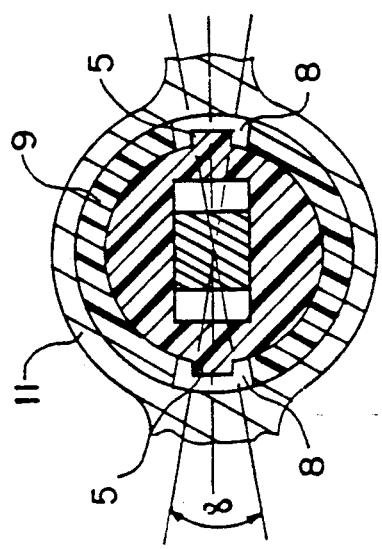
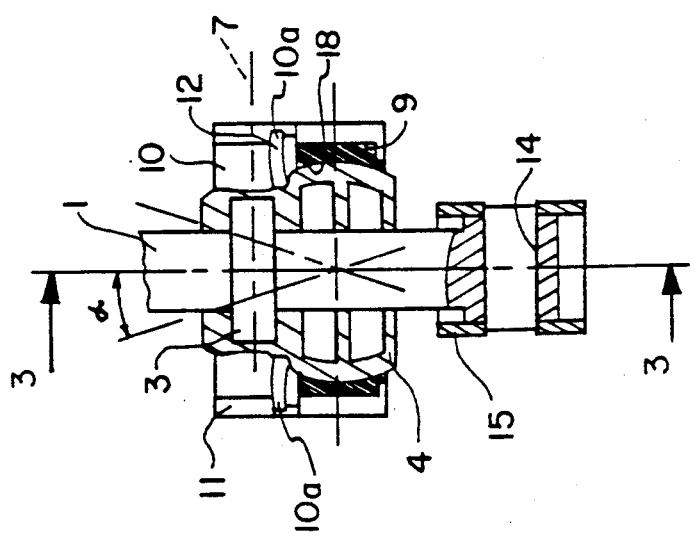
FIG. 2
FIG. 3
FIG. 4

BEARING FOR THE GEAR SHIFT LEVER OF THE GEAR CHANGE BOX IN MOTOR VEHICLES

BACKGROUND OF THE INVENTION

1. Field of the Invention

The invention relates, in general, to pivotal joint construction and, in particular, to a new and useful bearing for the gear shift lever of a mechanical remote control of the selector shaft of a gear change box of a motor vehicle.

2. Description of Prior Art

A similar device is disclosed in AT-PS 25 47 17. According to this patent, a hand-operated gear shift lever with a joint ball is housed in a component of the body in such manner that it can swivel universally. It is connected in an articulated manner with a lever, which by means of intermediate links transfers to a sliding selector shaft the angular movement conveyed to the lever by the lever movement. The sliding selector shaft is, in turn, pivotally connected by means of other intermediate links, with the selector shaft housed gear change box in the in such manner that it can rotate and can slide axially in the direction of travel. The intermediate links are necessary in order to compensate for displacement components that issue from the selector shaft moving in an arc and which cannot be transferred to the precisely guided selector shaft inside the gear change box. In order to engage the gear change box, only a pure rotation around the longitudinal axis (selection axis) of the selector shaft and a purely linear movement in the axis direction of the selector shaft (engagement) can be used. The rotation of the selector shaft around its longitudinal axis is normally done by means of a sideways swing of the gear shift lever and the axial sliding of the selector shaft by swivelling of the gear shift lever in the direction of travel.

Joint balls in the bearing of a gear shift lever for the gear change box in vehicles are also known from German Patent No. 32 08 543, German publication 30 16 373, and European publication 0 104 024.

SUMMARY OF THE INVENTION

The task of the invention is the construction of a gear shift lever with the following: a precise guiding of the gear shift lever during selection and changing, fewer components than are required by the state of the art, a reduced need for space for the housing, and a smaller expenditure of energy for executing the change movement.

The invention consists of a movable bearing for the gear shift lever for mechanical remote control of the sliding selector shaft of a gear change box. The gear change lever is housed in a component attached to the body, in such manner that it can swivel around a selection axis as well as around a shift axis, which lies at an angle, and is joined to the sliding selector shaft in the gear change box. The gear change lever is supported in a movable bearing so that it can swivel around a defined axis of a link pin. The movable bearing is housed rotatably in the component attached to the body so that it can rotate around another defined axis and, with a limited angle of rotation, around the main axis laid through the center of the first axis and the link with the sliding selector shaft.

A movable bearing constructed with these characteristics facilitates precision guiding of the gear shift lever during swivelling on the selection level as well as during swivelling on the changing level around clearly defined axes that can be achieved through journal bearings. At the same time, the components needed to convey the gear shift lever movements to the selector shaft in operation and to compensate for undesired movement components can be considerably reduced. The precision guiding facilitates reduced-friction link joints, so that the gear shift lever can be moved with an extreme limited expenditure of energy in order to execute the gear shifting movements.

A practical embodiment of the invention provides for a shift movable bearing with an external globular contour, in which the gear shift lever is housed on a swivel pivot so that it can swivel on the gear shift axis, and which is rotatably housed, with pivots the common axis of which forms a right angle to the swivel axis of the movable lever in the gear shift bearing unit, in recesses of the component fixed to the body, so as to rotate around their common axis and also around the vertical axis of the gear shift lever.

This facilitates the kinetically determined twisting of the shift lever on its vertical axis, together with the gear movable bearing, when the lower shift end of the gear shift lever moves in an arc. This permits the use of a rearranged sliding selector shaft that is connected merely by a cardan-type link with the selector shaft in the gear change box, and by a simple hinge with the lower shift end of the gear shift lever.

Particularly advantageous is the integral construction of this movable bearing of the gear shift lever. All the parts of the movable bearing and its housing are premanufactured, constructed as a unit and then merely coupled to the sliding selector shaft. Lastly, it should be particularly noted, that the features of the invention permit the use of a movable bearing with two precisely defined movement axes in the smallest possible space. This is in accordance with modern vehicle construction methods in which the space available for the housing of operating shafts is constantly being reduced.

Accordingly, it is an object of the invention to provide a movable bearing which comprises a housing having a fixed member with a ring positioned in the fixed member and having an inner surface forming a semi-spherical pivot surface for the movable bearing which is rotatably supported on the inner surface, a gear change lever extending through the tubular interior and pivotally supported on a link pin which is rotatably supported in the movable bearing so that the gear lever is pivotal on the link pin about an axis transverse to the axis of the lever, the lever having a lower end extending out of the movable bearing with a hinge pin connected through the lever substantially parallel to the link pin and which also includes a link connected to the hinge pin and supporting it so as to permit pivoting of the lever about the hinge pin.

A further object of the invention is to provide a device for supporting a gear shift lever for a mechanical control lever of a gear selection shaft which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1a is a representation of the displacement angle of the sliding selection movement of the gear shift lever;

FIG. 2 is a cross-section taken along the line 2—2 of FIG. on a scale larger than that of FIG. 1;

FIG. 3 is a cross-section taken along the line 3—3 of FIG. 2;

FIG. 4 is a cross-section taken along the line 4—4 of FIG. 3.

DETAILED DESCRIPTION OF THE DRAWINGS

Figure 1:
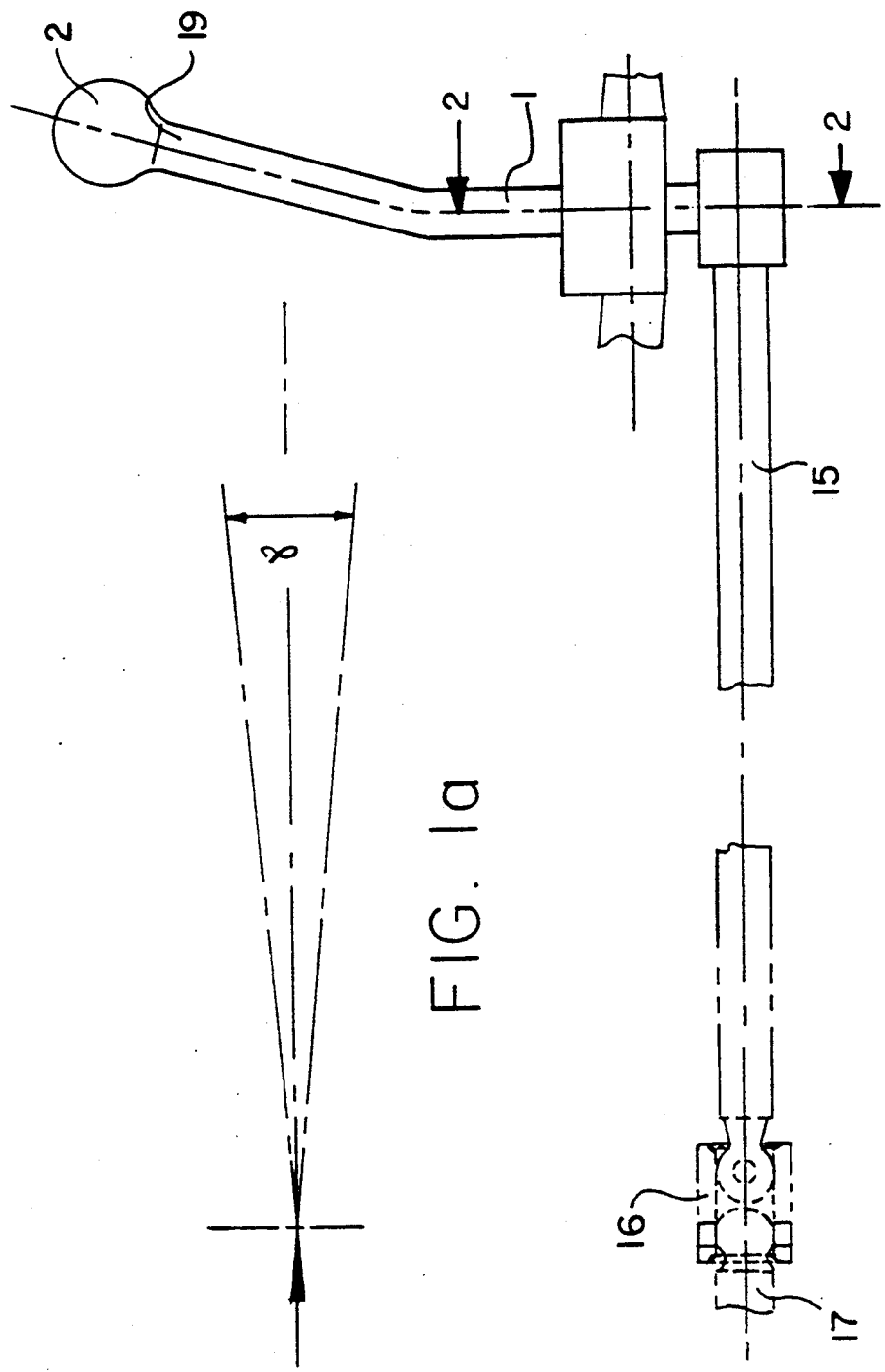
FIG. 1 is a schematic side elevational view of a housing of a gear shift lever constructed in accordance with the invention.

A gear shift lever 1 has an upper end which has at least one attached knob 2 and an angularly offset portion 19. This gear shift lever 1 is pivotally supported by means of a link pin 3 in a movable bearing 4. The movable bearing 4 is shaped like a ball externally, and is constructed with journals 5 at two facing points, the common axis 6 of which lies approximately at right angles to axis 7 of link pin 3. With these bearing journals 5 the movable bearing 4 engages in journal bearing recesses 8 of a ring 9 made of a low-friction plastic having an inner pivot surface 18, which is inserted into a stationary component or fixed member 11 attached to the body. The ring 9 is held in the fixed member 11 by means of a spring washer 12 which engages spring recess 10a of the wall 10. The slots 8 around the edge of the ring 9 allow the movable bearing 4 to make a limited rotation around the main axis 13 of gear shift lever 1. The lower shift end of this gear shift lever 1 is connected by means of a simple hinge or pin 14 with one end of the sliding selector shaft 15, the other end of which is connected via a cardan-type or universal joint link 16, with the sliding selector shaft 17 of the gear change box.

In the example shown in the drawing, axis 6 of journals 5 defines the selection axis, and this axis is oriented approximately in the direction of travel of the vehicle, in accordance with customary gear change housings. Switching axis 7 of link pin 3 is crosswise thereto. The gear shift lever 1 is housed in the bearing 4 by means of the link pin 3. This switching axis 7 is accordingly crosswise to the direction of travel, so that the gear shift lever 1 is moved crosswise for selection movements, in the direction of travel for changing movements.

When the gear shift lever 1 is moved around the selection axis 6 in the range of the selection angel alpha shown in FIG. 2, the hinge 14 moves in an arc, so that the joined end of the sliding selector shaft 15 is shifted upward and at a displacement angle gamma in relation to the longitudinal axis of the gear shaft 17. This shift by angle gamma results in a twisting of the gear shift lever 1 and the movable bearing 4 around the main axis 13 of the gear shift lever, which is facilitated by movement of journals 5 in the slot-shaped recesses 8 of ring 9, with the recesses 8 simultaneously forming a block for this rotation angle. When the gear shift lever 1 is moved in the region of the shift angle beta, sliding selection shaft 15 slides axially. This axial slide is transmitted directly to the gear change shaft 17, whereupon the hinge 14 similarly shifts upward. This movement, however, has no further influence. The drawing already shows a very compact embodiment, but its measurements can be further reduced by positioning axes 6 and 7 crossing in the same plane. If necessary, the ball-shaped outer contour of the movable bearing can also be eliminated.

While specific embodiments of the invention have been shown and described in detail to illustrate the application of the principles of the invention, it will be understood that the invention may be embodied otherwise without departing from such principles.

What is claimed is:

1. A gear shift lever bearing comprising:
    a movable bearing having a ball-shaped exterior surface;
    a fixed member including means defining a journal bearing recess and means defining an inner bearing surface complementary to said movable bearing for supporting said movable bearing;
    a gear shift lever extending through said movable bearing;
    a link pin rotatably supported in said movable bearing and connected through said gear shift lever for pivotal movement of said gear shift lever about an axis transverse to the axis of said gear shift lever;
    journals on each side of said movable bearing extending substantially at right angles to said link pin, said journals being pivotable about an axis which is substantially at right angles to said link pin, permitting pivotal movement of said gear shift lever in said movable bearing;
    a hinge pin connected through a lower end of said gear shift lever and being substantially parallel to said link pin provided for pivotally connecting said gear shift lever to a sliding selector shift.

2. A gear shift lever bearing comprising a movable bearing including a ball-shaped exterior surface, a housing having a fixed member with a ring member carried in said fixed member and having a complementary inner bearing support surface to said movable bearing, said movable bearing rotatably supported on said inner bearing support surface, a gear shift lever extending through said movable bearing, a link pin rotatably supported in said movable bearing and connected through said gear shift lever for pivotal movement of said gear shift lever about an axis transverse to the axis of said gear shift lever, said gear shift lever having a lower end extending out of said movable bearing, a hinge pin connected through said gear shift lever and being substantially parallel to said link pin, said hinge pin provided for pivotally connecting said gear shift lever to a sliding selector shaft, said movable bearing having journals on each side extending at right angles to said link pin, said journals being pivotable about an axis which is at right angles to the pivotal axis of said link pin permitting pivotal movement of said gear shift lever in said movable bearing, said ring member mounted in said fixed member having journal bearing recesses permitting pivotal movement of said lever around the axis of said link pin as well as around the axis of said lever as well as around the axis of said journals.

3. A device for positioning a sliding selector shaft longitudinally and angularly about its axis, the device comprises:
    a movable bearing;
    a gear shift lever extending through said movable bearing having a first end for positioning a sliding selector shaft and a second end connected to the sliding selector shaft;

link pin means forming a pivotal connection between said gear shift lever and said movable bearing for supporting said gear shift lever for pivotal movement about an axis transverse to said gear shift lever axis;

a fixed member rotatably supporting said movable bearing;

a hinge pin, substantially parallel to said link pin, for connecting the sliding selector shaft to said second end of said gear shift lever;

two journals extending on opposite sides from said movable bearing forming an axis perpendicular to said link pin means;

said movable bearing having a ball-shaped outer surface;

a ring member held in said fixed member having an inner bearing surface complementary to said ball-shaped outer surface of said movable bearing, and having bearing recesses for housing said journals; and said journals and said journal bearing recesses allowing said gear shift lever to pivot about said journals as well as about the axis of said gear shift lever.

* * * * *